(12) United States Patent
Bocanegra et al.

(10) Patent No.: US 7,218,821 B2
(45) Date of Patent: May 15, 2007

(54) OPTICAL FIBER CABLES

(75) Inventors: Luis M. Bocanegra, Alpharetta, GA (US); Harold P. Debban, Snellville, GA (US); Peter A. Weimann, Atlanta, GA (US)

(73) Assignee: Furukawa Electric North America Inc., Norcross, GA (US)

( * ) Notice: Subject to any disclaimer, the term of this patent is extended or adjusted under 35 U.S.C. 154(b) by 0 days.

(21) Appl. No.: 10/923,121

(22) Filed: Aug. 20, 2004

(65) Prior Publication Data

US 2006/0039659 A1 Feb. 23, 2006

(51) Int. Cl.
*G02B 6/44* (2006.01)

(52) U.S. Cl. ..................... 385/103; 385/113
(58) Field of Classification Search .............. 385/103, 385/113
See application file for complete search history.

(56) References Cited

U.S. PATENT DOCUMENTS

| 5,651,081 | A | * | 7/1997 | Blew et al. ............... 385/101 |
| 6,356,690 | B1 | * | 3/2002 | McAlpine et al. ......... 385/109 |
| 6,542,674 | B1 | * | 4/2003 | Gimblet ................... 385/113 |
| 6,898,354 | B2 | * | 5/2005 | Kim et al. ................ 385/100 |
| 2003/0123824 | A1 | * | 7/2003 | Tatarka et al. ............ 385/113 |
| 2004/0114889 | A1 | * | 6/2004 | Lee ......................... 385/114 |

* cited by examiner

*Primary Examiner*—Frank G. Font
*Assistant Examiner*—Charlie Peng
(74) *Attorney, Agent, or Firm*—Peter V. D. Wilde

(57) ABSTRACT

The specification describes an optical fiber drop cable with a flat configuration and having two side-by-side subunits. One of the subunits contains a cable strength member, e.g. a steel wire or stranded wire. The other subunit is an optical fiber subunit, which contains the optical fiber(s), and also contains one or more additional strength members. In a preferred embodiment, the cable is dry, and has conformal encasements that couple the optical fiber(s) to the outer cable sheath.

14 Claims, 3 Drawing Sheets

OPTICAL FIBER CABLES

FIELD OF THE INVENTION

This invention relates to optical fiber cables specially adapted for drop line applications.

BACKGROUND OF THE INVENTION

Fiber-to-the-premises (FTTP) from local telephone and cable service providers is rapidly being implemented. This service requires a broadband optical fiber distribution network comprising local optical fiber distribution cables that are installed in neighborhood and city streets. The local distribution cable is a large fiber count (multi-fiber) cable. Single fiber or few fiber cables are used for the "drop" line from the street to the premises. In many cases, aerial drop lines are used, and these have special requirements. In other cases, buried drop lines are used, and these have different specific requirements.

Optical fiber drop cables are made in several designs. Most of these designs mimic earlier copper cable versions. Physical resemblance is deliberate, so that the external cable appearance matches that of existing copper versions, and standard hardware and installation equipment may be used for both. Thus "A-drop" optical fiber cable is an optical fiber version of A-drop copper cable, and is made in the same flat or ribbon-like configuration. Aerial drop cable typically has one or more strength members for support. A common A-drop or flat cable design comprises one or more optical fibers between two strength members. See for example, U.S. Pat. No. 6,501,888.

Optical fiber cables also commonly contain gel-filling compounds for preventing water excursion in the cable. When water enters a cable, flow of water along the length of the cable is blocked by the gel. However, gel filled cables are time consuming to install and repair, as the gel must be completely removed from the optical fiber prior to splicing operations. Moreover, since the drop wire is typically attached to the side of a customer's home or building, bleeding of ingredients in the cable onto the customer's building may cause cosmetic or other problems.

Since aerial drop cables are subjected to considerable movement and sag due to wind and ice build-up, and due to mechanical strain caused by differential thermal expansion, aerial drop cables commonly have a loose fiber design. In this design the optical fibers are loosely received, "floating" within the cable encasement. The premise is that the optical fibers are mechanically isolated from at least some of this movement. However, a drawback to this design is that the cable may suffer fiber retraction due to the movement just mentioned. Fiber retraction occurs when the outer sleeve of the optical fiber cable sags or is stretched relative to the optical fibers. Excessive fiber retraction may result in damage or breakage of the fibers.

Several examples of drop cable are described in U.S. Pat. No. 4,761,053. Most of these examples describe copper drop wire but a few optical fiber versions are given as well. These show loose fiber designs as just mentioned.

Another FTTP drop cable design is shown at pages 500–506 of the Proceedings of the $51^{st}$ International Wire and Cable Symposium. This design is a combined flat optical fiber cable and a wire support member.

New designs offering for FTTP drop cable that offer compact size and low cost are continually being sought.

STATEMENT OF THE INVENTION

We have designed an optical fiber cable suitable for drop cable applications that has a compact flat profile. The new design has a binary construction of two subunits molded together side-by-side. Preferably, the two subunits match geometrically. One subunit contains the optical fibers, and the other unit contains a strength member. The subunit containing the optical fibers also contains one or more separate and additional strength members. In a preferred embodiment, the cable has a coupled fiber design, and is dry. The coupled design forms a unitary assembly that is robust, and resistant to fiber retraction. The combination of a flat cable profile, with a strength member that is easily separated from the optical fiber subunit, and with a separate strength member in the optical fiber subunit, results in a design that is well adapted to multiple drop cable applications.

DETAILED DESCRIPTION

Figure 1:
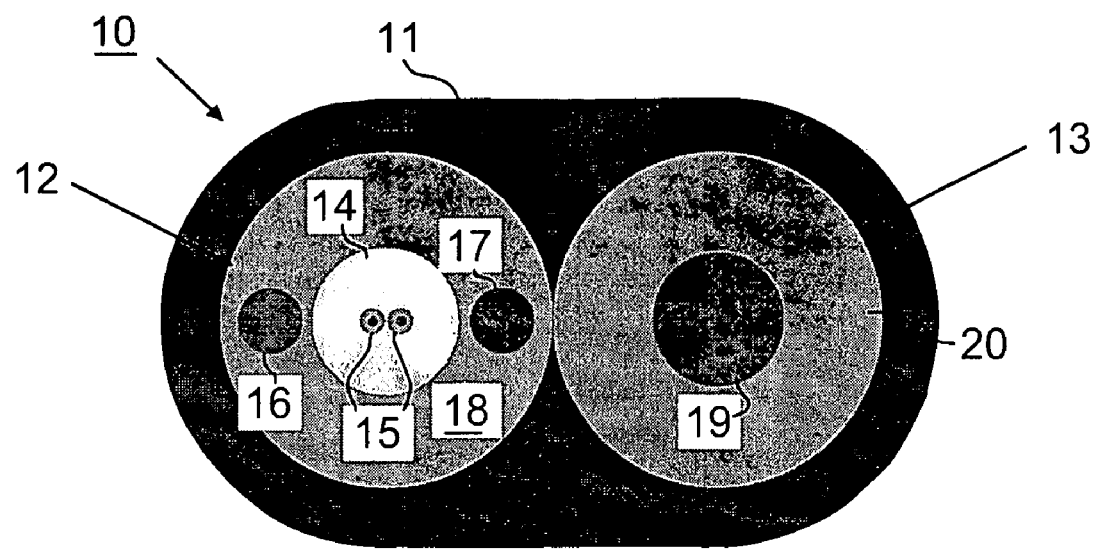
FIG. 1 is a sectional view of one embodiment of the optical fiber drop cable of the invention.

Referring to FIG. 1, a flat optical fiber drop cable is shown generally at 10, with optical fiber subunit 12 and strength member subunit 13. Both are encased in encasement 11. The subunits are preferably approximately the same size, as shown, which imparts symmetry to the cable cross section. Alternatively, they may be different sizes. Symmetry, if desired, may be realized in the latter case by using a symmetrical die for extruding the encasement 11. In the embodiment shown, the optical fiber subunit contains two fibers 15. One fiber, or more than two fibers, may also be used.

Figure 2:
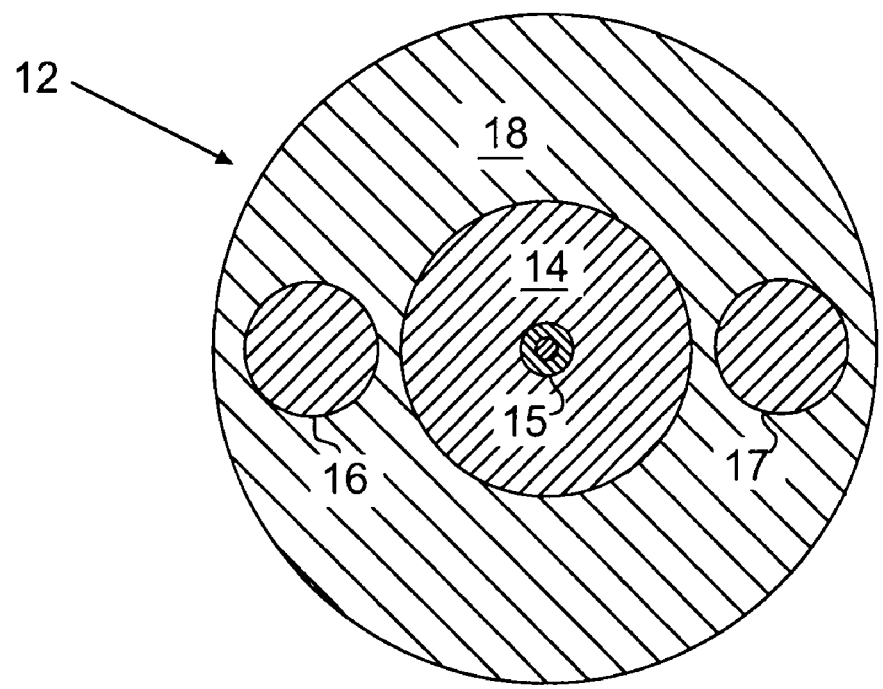
FIG. 2 is sectional view of the subunit that contains the optical fiber assembly.
Figure 3:
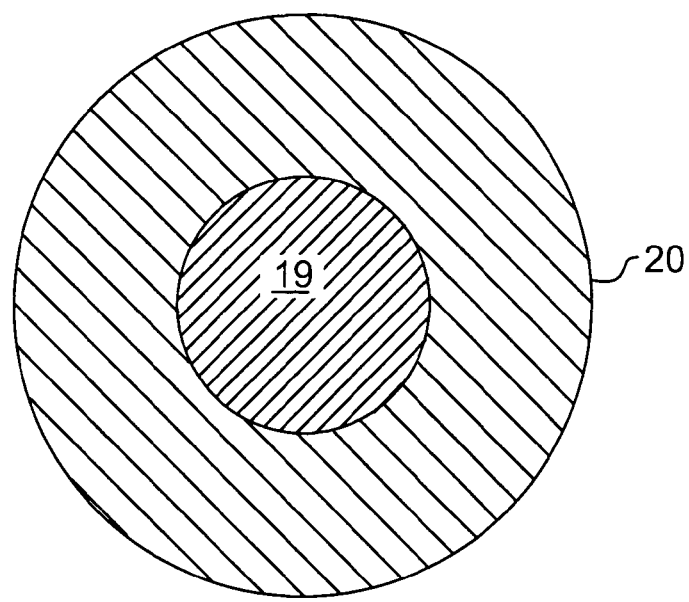
FIG. 3 is a sectional view of the subunit that contains the strength member.

The subunits 12 and 13 are shown in more detail in FIGS. 2 and 3. FIG. 2 is a cross section of the optical fiber subunit 12. Here, there is one optical fiber shown at 15. The optical fiber is a conventional coated glass or plastic fiber. The optical fiber subunit may have a loose fiber design, where the optical fiber floats in a tube. However, the preferred design is that illustrated, where the optical fiber is embedded in an inner polymer layer 14, coupled to conformal encasement layer 18, to complete the optical fiber subunit. The optical fiber subunit is cabled together with subunit 13 in outer cable sheath 11.

As shown, in the portion of the cable 10 that contains the optical fiber subunit, there are three polymer layers 11, 14, and 18. To distinguish and define these, the following description will refer to the inner encasement that surrounds the optical fiber, and couples the optical fiber to the outer parts of the cable, as the optical fiber encasement or OF encasement. Layer 18, the conformal layer that surrounds the OF encasement, and contains one or more strength members, is referred to as the OFSM encasement, and the outer encasement 11, which forms the outer cable jacket, is referred to as the cable encasement. In the preferred embodiment of the invention, all three layers are present. The optical fiber subunit assembly that comprises the OF encasement and the OFSM encasement is referred to below as the OF subunit. In the embodiment shown in FIGS. 1, 5, and 6, the OF encasement contains 2 optical fibers 15, and the OFSM encasement contains two strength members 16 and 17.

In the designs illustrated, the two strength members 16 and 17 are located on either side of the optical fiber(s) 15. The strength members 16 and 17, and the optical fiber(s) 15, are preferably "in-line", i.e. their centers lie on the same axis. The strength members 16 and 17 have several useful features. They are made of a material with high tensile strength, e.g. a resin with reinforcing fibers. Fibers for this purpose are well known and widely used. Examples are glass fibers and Kevlar (aramid) fiber. The resin may be any of a wide variety of polymer host materials, and is preferably a thermoset urethane or acrylate resin, cured by heat or UV radiation. Although metallic wires could also be used, non-metallic reinforced fiber strength members are preferred, as they do not need to be grounded and are not vulnerable to lightning strikes and induced electric currents.

The strength members 16 and 17 also serve as armoring to protect the sides of the optical fiber subunit. The most vulnerable part of a cable with the shape shown is the outer edge of the optical fiber subunit 12. Sharp instruments used for splicing, or sharp surfaces encountered in installation tend to impact the edges of the subunit. With the in-line design, the optical fiber system is effectively protected from these hazards. As described in greater detail below, when the optical fiber subunit is stripped from the strength member subunit, the optical fibers are still protected.

The strength member subunit is shown generally at 13, and is referred to below as the SM subunit. One embodiment of the SM subunit is shown in cross section shown in FIG. 3. FIG. 3 shows a SM subunit with strength member 19, and strength member encasement 20. The latter will be referred to as the SM encasement. The material of the strength member in the SM subunit may be the same as, or different than, the material of the OFSMs 16, 17. For low cost and high strength, steel is particularly suitable. Steel also provides a conductor for a potential ground connection, and is useful for locating buried cable. The SM subunit may comprise either a single steel strand, or a braided steel rope consisting of small steel strands in applications where greater flexibility is desired.

For applications where risk of damage to the overall cable structure due to lightning is high, a non-conductive strength member is preferred. The purpose of the SM subunit is to provide tensile strength to the cable during installation and service; the SM subunit does not need to provide compressive strength. Therefore, a non-metallic SM unit can be flexible, consisting of flexible fiberglass, aramid yarn, or a semiflexible fiberglass/resin reinforcement. A preferred embodiment uses a 2.7 mm semiflexible fiberglass/resin reinforcement, upjacketed to the same diameter as the optical fiber subunit. A nonmetallic cable construction using a flexible strength member 19 overcomes a serious limitation of prior art designs such as those taught in U.S. Pat. No. 6,501,888. These designs rely on rigid fiberglass reinforcements to provide tensile and compressive strength, and as a result these cables are very rigid and difficult to work with during installation. The modular cable 10 is significantly more flexible than prior art designs when a flexible nonmetallic strength member 19 is utilized.

Materials for the encasement layers may be selected from a wide variety of polymers. Suitable choices are polyolefins and ester-based polymers such as polyethylene, polypropylene, polyvinylchloride, ethylene-vinyl acetate polymers, ethylene acrylic acid polymers, ester-based polymers, and co-polymers of the foregoing. A specific example is Geon W2402, a drop cable grade polyvinylchloride resin available from the Polyone Corporation. These materials are given by way of example are not limiting of potential suitable materials. In each case the density and other properties of the polymers may be tailored by methods well known in the art to provide the characteristics desired. For example, the optical fiber drop cables may require fire-retardant polymers. An example is DGDA-1638-NT, a fire-retardant low-smoke zero-halogen resin available from the Dow Chemical Company. The encasements may be applied by any suitable technique, e.g. extrusion, or UV coating.

Differential shrinkage between the material comprising the secondary encasement and the primary encasement will also affect the amount of longitudinal shrink-back of the drop cable in service. To reduce that effect, the material of the cable encasement may contain 10% or more of a filler, such as calcium carbonate. The other encasement layers may also contain at least 10% of a filler.

The detrimental consequences of shrink-back as well as fiber retraction are addressed inherently by the preferred cable design of the invention. In conventional drop cables that have a loose fiber design, the outer sheath of the cable is free to shrink or distend (due to cable sag) independent of the optical fiber assembly. In the cable designs described here, the coupling of the optical fiber system to the outer sheath (cable encasement) minimizes differential dimensional changes between the optical fiber system and the cable encasement, reducing the likelihood of separation between elements in the cable, or breaking of the optical fibers. In addition, the coupled cable structure of the invention will retard both shrinkage and sagging of the overall cable assembly.

Increased coupling of the optical fiber assembly to the OF encasement, and the OF encasement to the cable encasement, to yield the advantages mentioned above, is achieved in part by adhesion between the optical fibers and the OF encasement, the OF encasement and the OFSM encasement, and the OFSM encasement and the cable encasement. This adhesion may occur through fusing the units together using heat in cable processing, or through frictional coupling of the various components.

While the cable designs described here are primarily intended for aerial or direct-buried drop applications, the cable encasement material may be specially designed for air blown installations. See U.S. patent application Ser. No. 10/233,719, filed Sep. 3, 2002, incorporated by reference herein. For aerial drop cable applications, the cable encasement may be loaded with carbon black to prevent degradation caused by UV sunlight. Other details of appropriate cable encasement materials may be found in U.S. Pat. No. 6,317,542.

Another feature of the drop cable design of the invention is that the arrangement of the dual strength members (16, 17 in FIG. 1) allows convenient stripping of the optical fiber subunit for splicing etc. To separate the optical fibers from the rest of the OF subunit, the end of the OF encasement may be notched at a point on either side of the optical fibers, and, using the two strength members, the subunit may be pulled apart to expose the optical fibers. The individual fibers are stripped, and spliced or connected, following conventional practice.

Figure 4:
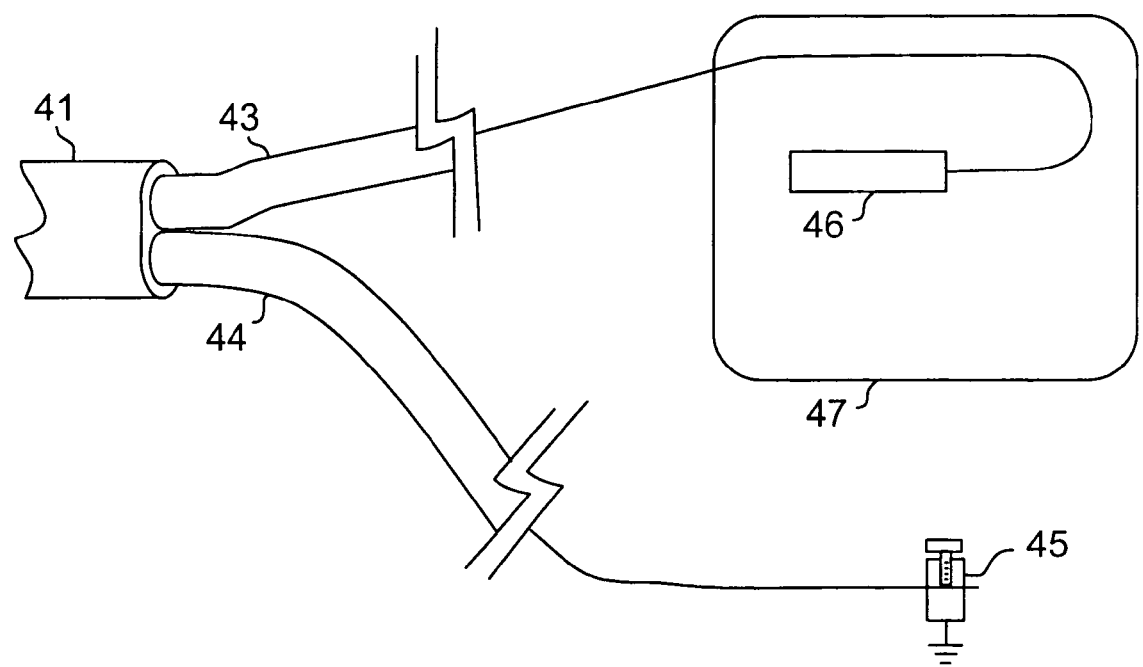
FIG. 4 is a schematic view showing the separation of the two subunits in the cable.

Likewise, a similar procedure may be used for separating the OF subunit from the SM subunit. Here, the SM strength member is pulled away from the cable. This separation is illustrated in FIG. 4 where the unitary cable is shown at 41. The cable is easily separated into the subunits described above, i.e. OF subunit 43, and SM subunit 44. In FIG. 4 the OF subunit is shown leading to a connector box 47 on the customer premises, and to an optical fiber connector 46, and the SM subunit leads to a clamping device 45 also associated with the customer location. In separating the OF subunit from the cable, the encasements can be chosen such that the strength member (19 in FIG. 3) alone separates from the remainder of the cable. That is easily accomplished by suitable choice of the encasement 20 in FIG. 3. A low strength polymer, and one that adheres to the cable encasement, can ensure that the strength member 19 rips through the SM encasement. This is also easily implemented if the SM encasement is omitted.

The OF encasement, and the SM encasement, may comprise more than one layer, each having the properties indicated. In some cases, it may be advantageous to have an inner adhesive encasement layer adjoining the optical fiber assembly. Or, as may be preferred in some cases, an encasement may be omitted. Two such embodiments are shown in FIGS. 5 and 6

Figure 5:
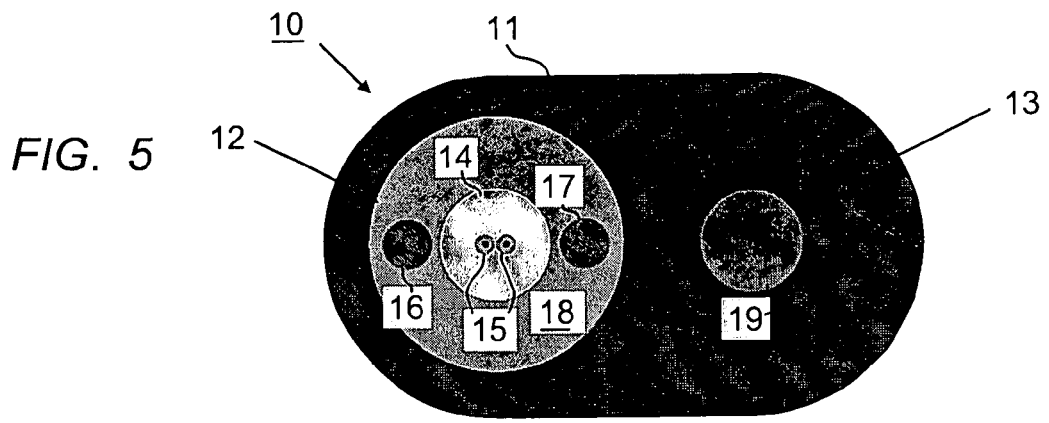
FIGS. 5 and 6 are figures similar to that of FIG. 1 showing alternative cable designs according to the invention.
Figure 6:
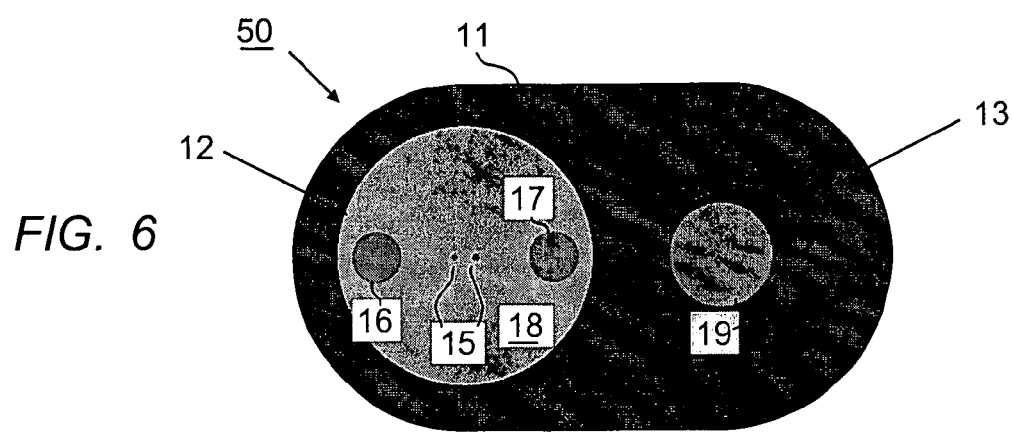

FIG. 5 shows an embodiment where the SM encasement is omitted. FIG. 6 shows an embodiment where both the SM encasement and the OF encasement are omitted. One function of the SM encasement is to simplify the cabling process. If both the OF subunit and the SM subunit are approximately the same diameter, the extrusion of a symmetrically shaped cable is straightforward. However, with proper choice of the cabling equipment, the symmetrical shape can be achieved using subunits of unequal diameter. Another option in this connection is to use a strength member 19 of approximately the same diameter as the OF subunit.

In a preferred embodiment for aerial installation, the SM subunit comprises a single steel strand, approximately 2.0 mm in diameter, up-jacketed to match the outer diameter of the OF subunit. The relatively large steel strand is necessary to provide sufficient tensile strength such that the cable can survive ice and wind loading.

In a preferred embodiment for direct-buried installation, the SM subunit comprises a single steel strand, approximately 1.2 mm in diameter, up-jacketed to match the outer diameter of the OF subunit. This smaller steel strand has sufficient tensile stiffness for the application, as well as sufficient conductivity to be located using conventional equipment.

Figure 7:
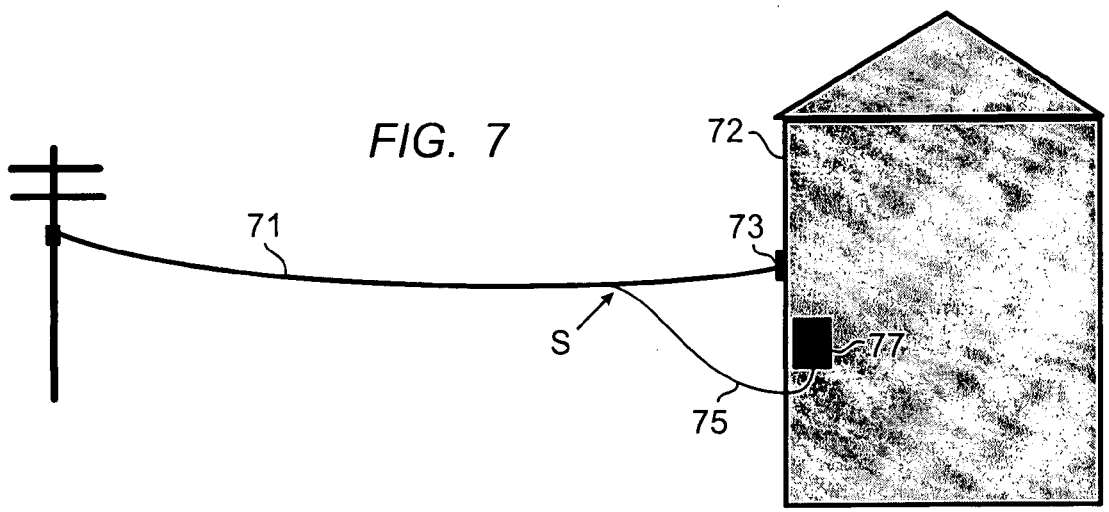
FIG. 7 is a schematic view of a drop cable installation.

FIG. 7 is a schematic of an aerial drop wire installation, and illustrates a main feature of the invention. The drop cable 71 is shown installed on the side of building 72. The cable is separated at point S, and the SM strength member is attached to clamp 73 on the premises. The OF subunit of the cable leads to a connection box 77, where the OF subunit is stripped, as described earlier, and the optical fibers connected to the customers system. An advantage of the cable design of the invention is that the OF subunit loop 75, where the OF subunit is no longer supported or protected by the SM subunit, continues to have essentially equivalent protection and support due to the strength members in the OF subunit. This allows the loop 75 to extend over significant distances where the installation requires that. In addition, if the OF subunit is constructed from flame-retardant materials, it may be directly routed into a customer premises as a breakout cable if desired. During termination of the fiber, the strength members in the OF subunit may also be used to conveniently provide strain relief for the fibers. The fiber and strength member encasements may be stripped away, leaving only strength members and bare fiber. The strength members may be trimmed and clamped or glued to the connection box, leaving slack fiber entering a connector. This slack fiber can prevent breakage of fiber splices and associated service outages caused by stress resulting from thermal or mechanical strain of the cable.

Modifications in the geometry of the elements shown may be made while still achieving the benefits of the invention. For example, the strength members are shown in the figures as having a round cross section. Also the optical fiber system is shown with a round cross section. Either of these shapes may be varied.

Optical fiber cable intended for drop applications typically has, in cable terms, relatively small dimensions and relatively few, for example 1–12, optical fibers. The overall width may be less than 0.5 in. The thickness will typically vary from 0.3 to 0.7 times the width. The preferred cross section is a "racetrack" shape, a descriptive term used here to define two half circles joined by approximately straight lines. Preferably, but not essential, the two half circles have the same radius. The symmetrical configuration, in either a racetrack or FIG. 8 shape, has several practical advantages. It mimics the shape of various copper cables that are widely used. Among these are A-drop aerial copper cable, C-drop buried copper cable, and F-drop self-support copper cable. This provides a compatibility feature that appeals to customers. It also allows portions of previously installed equipment to be re-used, for example, connector hardware.

The term strength member is defined as a strand of material with a tensile strength substantially greater than the material surrounding the strength member. Strength members are well known and widely used in cable technology, so the meaning of the term should be clear and definite.

The optical fibers in the optical fiber subunit may be bundled or may be formed as an optical fiber ribbon. In the latter case, the optical fiber subunit may have the structure shown in FIG. 6, i.e. with encasement 14 absent.

For some applications, for example in buried installations, it may be desirable to include a water-blocking agent in the cable. A water swellable yarn in the vicinity of the contact zone between the SM subunit 13 and the OF subunit 12 would suit that purpose. A yarn may also be used as a rip cord to aid in separating the subunits during installation.

Various other modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. Optical fiber drop cable comprising an optical fiber subunit and a strength member subunit, wherein both of the subunits are fully encased in a common cable encasement, and each of said subunits contains at least one strength member; wherein said strength members are solid in cross section and primarily adapted for imparting strength to the optical fiber drop cable; and wherein the optical fiber subunit comprises at least one optical fiber and a first encasement layer conformally coating the at least one optical fiber.

2. The optical fiber cable of claim 1 wherein the strength member subunit consists essentially of a strength member.

3. The optical fiber cable of claim 2 wherein the strength member comprises steel.

4. The optical fiber cable of claim 2 wherein the strength member comprises a non-metallic, continuous-fiber reinforcement.

5. The optical fiber cable of claim 2 wherein the strength member subunit additionally comprises a polymer encasement encasing the strength member.

6. The optical fiber cable of claim 1 wherein the optical fiber subunit cormprises:
   a second encasement conformally coating the first encasement, and the
   second encasement contains at least one strength member.

7. The optical fiber cable of claim 6 wherein the second encasement contains two strength members, with the at least one optical fiber located between the two strength members.

8. The optical fiber cable of claim 7 wherein the at least one optical fiber and the two strength members are aligned along a common axis.

9. The optical fiber cable of claim 1 wherein the cable cross section has an oval shape.

10. The optical fiber cable of claim 1 wherein the optical fiber subunit contains a single optical fiber.

11. The optical fiber cable of claim 1 wherein the optical fiber subunit comprises two or more optical fibers bundled together.

12. The optical fiber cable of claim 1 wherein the optical fiber subunit comprises two or more optical fibers ribboned together.

13. The optical fiber cable of claim 6 wherein the interface between the first and second encasements is a continuous polymer-to-polymer interface.

14. The optical fiber cable of claim 13 wherein the first encasement is extruded over the at least one optical fibers.

* * * * *